US008775166B2

(12) United States Patent
Wan et al.

(10) Patent No.: US 8,775,166 B2
(45) Date of Patent: Jul. 8, 2014

(54) CODING/DECODING METHOD, SYSTEM AND APPARATUS

(75) Inventors: Hualin Wan, Shenzhen (CN); Libin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 631 days.

(21) Appl. No.: 12/541,298

(22) Filed: Aug. 14, 2009

(65) Prior Publication Data

US 2010/0042416 A1 Feb. 18, 2010

Related U.S. Application Data

(63) Continuation of application No. PCT/CN2008/070286, filed on Feb. 5, 2008.

(30) Foreign Application Priority Data

Feb. 14, 2007 (CN) .......................... 2007 1 0080185

(51) Int. Cl.

| | |
|---|---|
| ***G10L 19/00*** | (2013.01) |
| ***G10L 21/00*** | (2013.01) |
| ***G10L 19/02*** | (2013.01) |
| ***G10L 19/14*** | (2006.01) |
| ***G10L 21/02*** | (2013.01) |
| ***G10L 15/20*** | (2006.01) |
| ***G10L 17/00*** | (2013.01) |
| ***G10L 21/04*** | (2013.01) |

(52) U.S. Cl.

USPC ........... 704/201; 704/204; 704/205; 704/220; 704/225; 704/226; 704/227; 704/228; 704/233; 704/246; 704/500; 704/501; 704/502; 704/503; 704/504

(58) Field of Classification Search

USPC ......... 704/201, 205, 225, 226, 233, 246, 500, 704/E19.006, 220, 204, 227, 228; 455/422.1, 552.1

See application file for complete search history.

(56) References Cited

U.S. PATENT DOCUMENTS 5,774,849 A * 6/1998 Benyassine et al. .......... 704/246
5,960,389 A * 9/1999 Jarvinen et al. ............... 704/220

(Continued)

FOREIGN PATENT DOCUMENTS

CN 1331826 1/2002
CN 1354872 6/2002

(Continued)

OTHER PUBLICATIONS

Benyassine et al.; ITU-T Recommendation G.729 Annex B: A Silence Compression Scheme for use with G.729 Otmized for V.70 Digital Simultaneous Voice and Data Applications; IEEE Commnication Magazine, pp. 64-73, Sep. 1997.*

(Continued)

*Primary Examiner* — Edgar Guerra-Erazo
(74) *Attorney, Agent, or Firm* — Leydig, Voit & Mayer, Ltd.

(57) ABSTRACT

An encoding method includes: extracting core layer characteristic parameters and enhancement layer characteristic parameters of a background noise signal, encoding the core layer characteristic parameters and enhancement layer characteristic parameters to obtain a core layer codestream and an enhancement layer codestream. The disclosure also provides an encoding device, a decoding device and method, an encapsulating method, a reconstructing method, an encoding-decoding system and an encoding-decoding method. By describing the background noise signal with the enhancement layer characteristic parameters, the background noise signal can be processed by using more accurate encoding and decoding method, so as to improve the quality of encoding and decoding the background noise signal.

25 Claims, 6 Drawing Sheets

(56) References Cited

U.S. PATENT DOCUMENTS

| | | | | |
|---|---|---|---|---|
| 6,078,882 | A * | 6/2000 | Sato et al. | 704/233 |
| 6,240,386 | B1 * | 5/2001 | Thyssen et al. | 704/220 |
| 6,424,942 | B1 * | 7/2002 | Mustel et al. | 704/233 |
| 6,606,593 | B1 * | 8/2003 | Jarvinen et al. | 704/223 |
| 6,615,169 | B1 * | 9/2003 | Ojala et al. | 704/205 |
| 6,691,084 | B2 * | 2/2004 | Manjunath et al. | 704/221 |
| 6,721,712 | B1 * | 4/2004 | Benyassine et al. | 704/503 |
| 7,124,079 | B1 * | 10/2006 | Johansson et al. | 704/226 |
| 7,136,812 | B2 * | 11/2006 | Manjunath et al. | 704/221 |
| 7,203,638 | B2 * | 4/2007 | Jelinek et al. | 704/201 |
| 7,657,427 | B2 * | 2/2010 | Jelinek | 704/208 |
| 8,032,359 | B2 * | 10/2011 | Shlomot et al. | 704/201 |
| 8,195,450 | B2 * | 6/2012 | Shlomot et al. | 704/201 |
| 2001/0046843 | A1 * | 11/2001 | Alanara et al. | 455/95 |
| 2002/0012330 | A1 * | 1/2002 | Glazko et al. | 370/333 |
| 2002/0101844 | A1 * | 8/2002 | El-Maleh et al. | 370/342 |
| 2002/0161573 | A1 * | 10/2002 | Yoshida | 704/201 |
| 2004/0102969 | A1 * | 5/2004 | Manjunath et al. | 704/229 |
| 2005/0027520 | A1 * | 2/2005 | Mattila et al. | 704/228 |
| 2005/0143989 | A1 * | 6/2005 | Jelinek | 704/226 |
| 2005/0163323 | A1 | 7/2005 | Oshikiri | |
| 2006/0173677 | A1 * | 8/2006 | Sato et al. | 704/223 |
| 2007/0033023 | A1 | 2/2007 | Sung et al. | |
| 2007/0050189 | A1 * | 3/2007 | Cruz-Zeno et al. | 704/226 |
| 2007/0136055 | A1 * | 6/2007 | Hetherington | 704/227 |
| 2007/0147327 | A1 * | 6/2007 | Jin et al. | 370/342 |
| 2008/0010064 | A1 * | 1/2008 | Takeuchi et al. | 704/229 |
| 2008/0027716 | A1 * | 1/2008 | Rajendran et al. | 704/210 |
| 2008/0033717 | A1 * | 2/2008 | Sato et al. | 704/219 |
| 2008/0195383 | A1 | 8/2008 | Shlomot et al. | |
| 2009/0055173 | A1 * | 2/2009 | Sehlstedt | 704/233 |
| 2010/0268531 | A1 * | 10/2010 | Dai et al. | 704/210 |
| 2010/0280823 | A1 * | 11/2010 | Shlomot et al. | 704/201 |
| 2010/0324917 | A1 * | 12/2010 | Shlomot et al. | 704/501 |
| 2011/0015923 | A1 * | 1/2011 | Dai et al. | 704/226 |
| 2011/0035213 | A1 * | 2/2011 | Malenovsky et al. | 704/208 |
| 2011/0320194 | A1 * | 12/2011 | Shlomot et al. | 704/205 |
| 2013/0124196 | A1 * | 5/2013 | Dai et al. | 704/201 |

FOREIGN PATENT DOCUMENTS

| | | | |
|---|---|---|---|
| CN | 1650348 | A | 8/2005 |
| CN | 1684143 | | 10/2005 |
| CN | 1795495 | | 6/2006 |
| WO | 2008100385 | A2 | 8/2008 |

OTHER PUBLICATIONS

ITU-T G.729.1 Series G: Transmission Systems and Media Digital Systems and Networks: G.729 based Embedded Variable bit-rate coder: An 8-32 kbit/s scalable wideband coder bitstream interoperable with G.729, (May 2006).*

Sollaud et al.: "G.729.1 RTP Payload Format update: DTX support; draft-sollaud-avt-rfc4749-dtx-update-00.txt" IETF Standard-Working-Draft, Internet Engineering Task Force, IETF, CH, Jan. 14, 2008.

"Coding of Speech at 8 Kbit/s Using Conjugate Structure Algebraic-Code-Excited Linear-Prediction (CS-ACELP). Annex B: A Silence Compression Scheme for G.729 Optimized for Terminals Onforming to Recommendation V.70" ITU-T Recommendation G.729, Nov. 1, 1996.

State Intellectual Property Office of the People's Republic of China, Written Opinion of the International Searching Authority in International Patent Application No. PCT/CN2008/070286 (Apr. 24, 2008).

State Intellectual Property Office of the People's Republic of China, Examination Report in Chinese Patent Application No. 200710080185.1 (Mar. 29, 2010).

2nd Office Action in corresponding European Patent Application No. 08706859.3 (Feb. 19, 2013).

* cited by examiner

CODING/DECODING METHOD, SYSTEM AND APPARATUS

CROSS REFERENCE TO RELATED APPLICATIONS

This application is a continuation of International Patent Application No. PCT/CN2008/070286, filed on Feb. 5, 2008 which claims priority to Chinese Patent Application No. 200710080185.1, filed on Feb. 14, 2007; both of which are incorporated by reference herein in their entireties.

FIELD OF THE INVENTION

The present invention relates to encoding-decoding technologies, and more particularly, to an encoding-decoding method, system and device.

BACKGROUND

Signals transmitted in voice communications include a sound signal and a soundless signal. For the purpose of communication, voice signals generated by talking and uttering are defined as a sound signal. A signal generated in the gap between the generally discontinuous uttering is defined as a soundless signal. The soundless signal includes various background noise signals, such as white a noise signal, a background noisy signal and a silence signal and the like. The sound signal is a carrier of communication contents and is referred to as a useful signal. Thus, the voice signal may be divided into a useful signal and a background noise signal.

In the prior art, a Code-Excited Linear Prediction (CELP) model is used to extract core layer characteristic parameters of the background noise signal, and the characteristic parameters or the higher band background noise signal are not extracted. Thus, during the encoding and decoding, only the core layer characteristic parameters are used to encode/decode the background noise signal, while the higher band background noise signal is not encode/decoded. The core layer characteristic parameters include only a spectrum parameter and an energy parameter, which means the characteristic parameters used for encoding-decoding are not enough. As a result, a reconstructed background noise signal obtained via the encoding-decoding processing is not accurate enough, which makes the encoding and decoding of the background noise signal of bad quality.

SUMMARY

An embodiment of the invention provides an encoding method, which improves the encoding quality of the background noise signal.

An embodiment of the invention provides a decoding method, which improves the encoding quality of the background noise signal.

An embodiment of the invention provides an encoding device, which improves the encoding quality of the background noise signal.

An embodiment of the invention provides a decoding device, which improves the encoding quality of the background noise signal.

An embodiment of the invention provides an encoding-decoding system, which improves the encoding quality of the background noise signal.

An embodiment of the invention provides an encoding-decoding method, which improves the encoding quality of the background noise signal.

The encoding method includes: extracting core layer characteristic parameters and enhancement layer characteristic parameters of a background noise signal, encoding the core layer characteristic parameters and enhancement layer characteristic parameters to obtain a core layer codestream and an enhancement layer codestream.

The decoding method includes: extracting a core layer codestream and an enhancement layer codestream from a SID frame; parsing core layer characteristic parameters from the core layer codestream and parsing enhancement layer characteristic parameters from the enhancement layer codestream; decoding the core layer characteristic parameters and enhancement layer characteristic parameters to obtain a reconstructed core layer background noise signal and a reconstructed enhancement layer background noise signal.

The encoding device includes: a core layer characteristic parameter encoding unit, configured to extract core layer characteristic parameters from a background noise signal, and to transmit the core layer characteristic parameters to an encoding unit; an enhancement layer characteristic parameter encoding unit, configured to extract enhancement layer characteristic parameters from the background noise signal, and to transmit the enhancement layer characteristic parameters to the encoding unit; and the encoding unit, configured to encode the received core layer characteristic parameters and enhancement layer characteristic parameters to obtain a core layer codestream and an enhancement layer codestream.

The decoding device includes: a SID frame parsing unit, configured to receive a SID frame of a background noise signal, to extract a core layer codestream and an enhancement layer codestream; to transmit the core layer codestream to a core layer characteristic parameter decoding unit and the enhancement layer codestream to an enhancement layer characteristic parameter decoding unit; the core layer characteristic parameter decoding unit, configured to extract core layer characteristic parameters from the core layer codestream and to ode the core layer characteristic parameters to obtain a reconstructed core layer background noise signal; and the enhancement layer characteristic parameter decoding unit, configured to extract and enhancement layer characteristic parameters from the enhancement layer codestream and to decode the enhancement layer characteristic parameters to obtain a reconstructed enhancement layer background noise signal.

The encoding-decoding system includes: an encoding device, configured to extract core layer characteristic parameters and enhancement layer characteristic parameters from a background noise signal; to encode the core layer characteristic parameters and enhancement layer characteristic parameters and to encapsulate a core layer codestream and enhancement layer codestream obtained from the encoding to a SID frame; and a decoding device, configured to receive the SID frame transmitted by the encoding device, to parse the core layer codestream and enhancement layer codestream; to extract the core layer characteristic parameters from the core layer codestream; to synthesize the core layer characteristic parameters to obtain a reconstructed core layer background noise signal; to extract the enhancement layer characteristic parameters from the enhancement layer codestream, to decode the enhancement layer characteristic parameters to obtain a reconstructed enhancement layer background noise signal.

The encoding-decoding method includes:

extracting core layer characteristic parameters and enhancement layer characteristic parameters from a background noise signal; encoding the core layer characteristic parameters and enhancement layer characteristic parameters and encapsulating a core layer codestream and enhancement layer codestream obtained from the encoding to a SID frame; and parsing the core layer codestream and enhancement layer codestream from the SID frame; extracting the core layer characteristic parameters from the core layer codestream; decoding the core layer characteristic parameters to obtain a reconstructed core layer background noise signal; extracting the enhancement layer characteristic parameters from the enhancement layer codestream, decoding the enhancement layer characteristic parameters to obtain a reconstructed enhancement layer background noise signal.

DETAILED DESCRIPTION

Currently, a method for processing the background noise signal involves compressing the background noise signal using a silence compression scheme before transmitting the background noise signal. The model for compressing the background noise signal is the same as the model for compressing the useful signal and both models use the CELP compression model. The principle for synthesizing the useful signal and background noise signal is as follows: a synthesis filter is excited with an excitation signal and generates an output signal satisfying the equation $s(n)=e(n)*v(n)$, where $s(n)$ is the useful signal obtained from the synthesis processing, $e(n)$ is the excitation signal, and $v(n)$ is the synthesis filter. Therefore, the encoding-decoding of the background noise signal may be simply taken as the encoding-decoding of the useful signal.

The excitation signal for the background noise signal may be a simple random noise sequence generated by a random noise generation module. Amplitudes of the random noise sequence are controlled by the energy parameter, that is, an excitation signal may be formed. Therefore, parameters of the excitation signal for the background noise signal may be represented by the energy parameter. A synthesis filter parameter for the background noise signal is a spectrum parameter, which is also referred to as Line Spectrum Frequency (LSF) quantized parameter.

Figure 1:
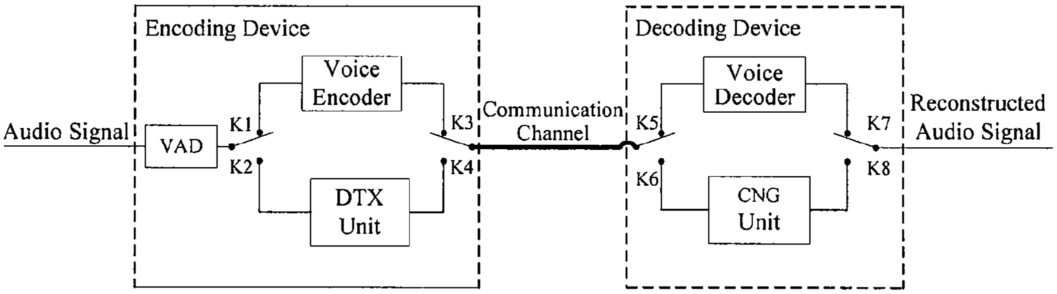
FIG. 1 is a block diagram illustrating a system for encoding-decoding the voice signal in an application scenario according to an embodiment of the invention.

FIG. 1 is a block diagram of a system for encoding-decoding the voice signal in an application according to an embodiment of the present invention. As shown in FIG. 1, the system includes an encoding device and a decoding device. The encoding device includes a voice activity detector (VAD), a voice encoder and a discontinuous transmission (DTX) unit; and the decoding device includes a voice decoder and a comfortable noise generation (CNG) unit.

The VAD is configured to detect the voice signal, to transmit the useful signal to the voice encoder, and to transmit the background noise signal to the DTX unit.

The voice encoder is configured to encode the useful signal and to transmit the encoded useful signal to the voice decoder via a communication channel.

The DTX unit is configured to extract the core layer characteristic parameters of the background noise signal, to encode the core layer characteristic parameters, to encapsulate the core layer code codestream into a Silence Insertion Descriptor (SID) frame, and to transmit the SID frame to the CNG unit via the communication channel.

The voice decoder is configured to receive the useful signal transmitted by the voice encoder, to decode the useful signal, and then to output the reconstructed useful signal.

The CNG unit is configured to receive the SID frame transmitted by the DTX unit, to decode the core layer characteristic parameters in the SID frame, and to obtain a reconstructed background noise signal, i.e. the comfortable background noise.

It should be noted that if the detected voice signal is a useful signal, switches are connected to K1, K3, K5 and K7 ends; if the detected voice signal is a background noise signal, the switches are connected to K2, K4, K6 and K8 ends. Both the reconstructed useful signal and the reconstructed background noise signal are reconstructed voice signals.

The system for encoding-decoding the voice signal is illustrated in the embodiment shown in FIG. 1. The voice signal includes the useful signal and background noise signal. In the following embodiment, the system for encoding-decoding the background noise signal is described.

Figure 2:
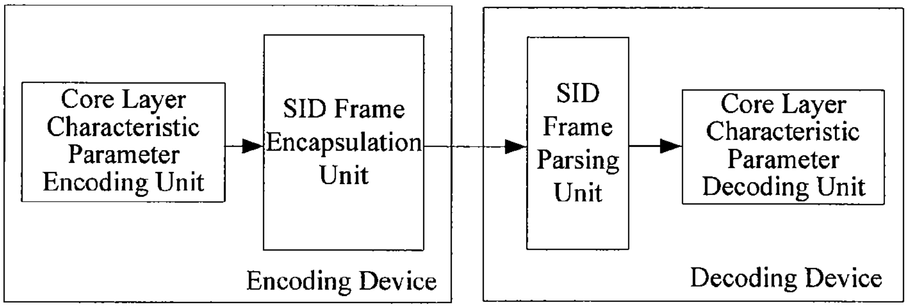
FIG. 2 is a block diagram illustrating a system for encoding-decoding the background noise signal in another application scenario according to an embodiment of the invention.

FIG. 2 is a block diagram of the system for encoding-decoding the background noise signal in another application according to the embodiment of the present invention. As shown in FIG. 2, the system includes an encoding device and a decoding device. The encoding device includes a core layer characteristic parameter encoding unit and a SID frame encapsulation unit; and the decoding device includes a SID frame parsing unit and a core layer characteristic parameter decoding unit.

The core layer characteristic parameter encoding unit is configured to receive the background noise signal, to extract the spectrum parameter and energy parameter of the background noise signal, and to transmit the extracted spectrum and energy parameters to the SID frame encapsulation unit.

The SID frame encapsulation unit is configured to receive the spectrum and energy parameters, to encode these parameters to obtain a core layer codestream, to encapsulate the core layer codestream into a SID frame, and to transmit the encapsulated SID frame to a SID frame parsing unit.

The SID frame parsing unit is configured to receive the SID frame transmitted by the SID frame encapsulation unit, to extract the core layer codestream, and to transmit the extracted core layer codestream to the core layer characteristic parameter decoding unit.

The core layer characteristic parameter decoding unit is configured to receive the core layer codestream, to extract the spectrum and energy parameters, to synthesize the spectrum and energy parameters, and to obtain a reconstructed background noise signal.

Figure 3:
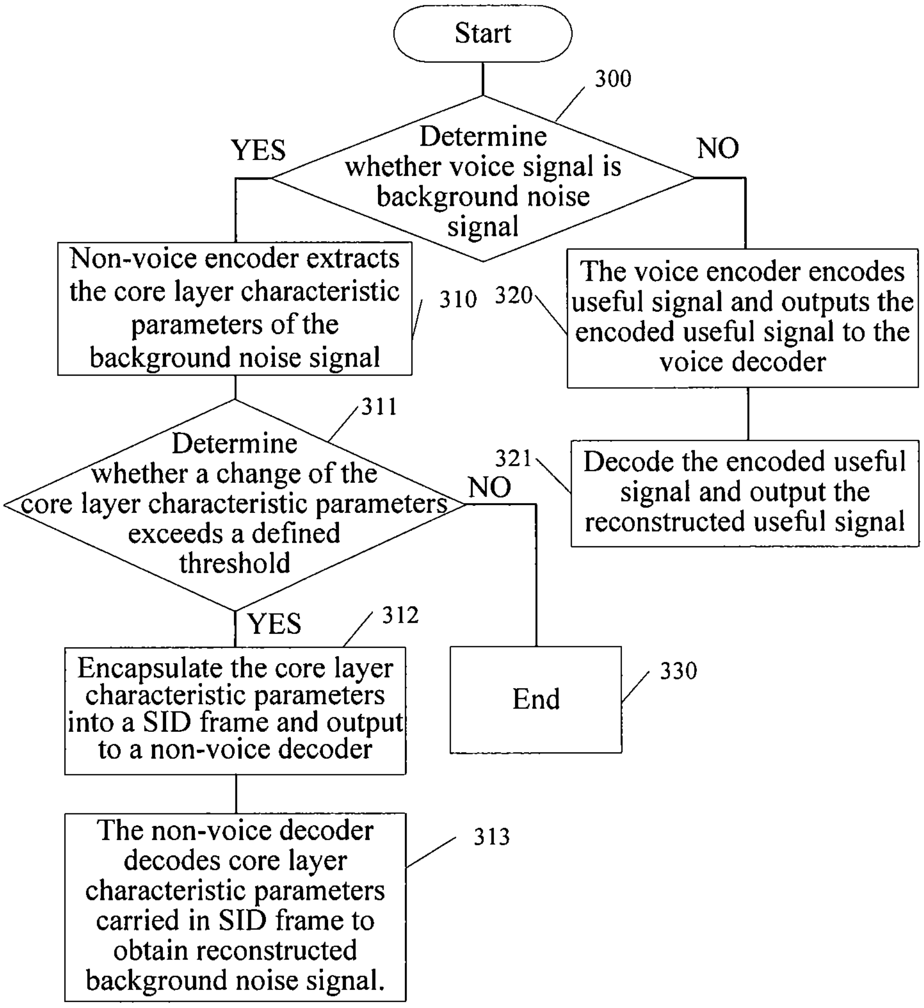
FIG. 3 is a flow chart illustrating a method for encoding-decoding the voice signal in another application scenario according to an embodiment of the invention.

FIG. 3 is a flow chart of a method for encoding-decoding the voice signal in another application according to an embodiment of the present invention. As shown in FIG. 3, the method includes the following steps:

Step 300: It is determined whether the voice signal is a background noise signal; if it is the background noise signal, step 310 is executed; otherwise step 320 is executed.

At this step, the method for determining whether the voice signal is the background noise signal is as follows: the VAD makes a determination on the voice signal; if the determination result is 0, it is determined that the voice signal is the background noise signal; and if the determination result is 1, it is determined that the voice signal is the useful signal.

Step 310: A non-voice encoder extracts the core layer characteristic parameters of the background noise signal.

At this step, the non-voice encoder extracts the core layer characteristic parameters, i.e. the lower band characteristic parameters. The core layer characteristic parameters include the spectrum parameter and the energy parameter. It should be noted that the core layer characteristic parameters of the background noise signal may be extracted according to the CELP model.

Step 311: It is determined whether a change in the core layer characteristic parameters exceeds a defined threshold. If it exceeds the threshold, step 312 is executed; otherwise, step 330 is executed.

Step 312: The core layer characteristic parameters are encapsulated into a SID frame and output to a non-voice decoder.

At this step, the spectrum and energy parameters are encoded. The encoded core layer code codestream is encapsulated into the SID frame as shown in Table 1.

TABLE 1

| Characteristic parameter description | Number of bits |
|---|---|
| LSF quantization predictor index | 1 |
| First stage LSF quantized vector | 5 |
| Second stage LSF quantized vector | 4 |
| Gain | 5 |

The SID frame shown in Table 1 conforms to the standard of G.729 and includes an LSF quantization predictor index, a first stage LSF quantized vector, a second stage LSF quantized vector and a gain. Here, the LSF quantization predictor index, the first stage LSF quantized vector, the second stage LSF quantized vector and the gain are respectively allocated with 1 bit, 5 bits, 4 bits and 5 bits.

In the above parameters, the LSF quantization predictor index, the first stage LSF quantized vector and the second stage LSF quantized vector are LSF quantization parameters and belong to a spectrum parameter, and the gain is an energy parameter.

Step 313: The non-voice decoder decodes the core layer characteristic parameters carried in the SID frame to obtain the reconstructed background noise signal.

Step 320: The voice encoder encodes the useful signal and outputs the encoded useful signal to the voice decoder.

Step 321: The voice decoder decodes the encoded useful signal and outputs the reconstructed useful signal.

Step 330: The procedure ends.

Embodiments of the invention provide a method, system and device for encoding-decoding. When the background noise signal is encoded, the core layer characteristic parameters and enhancement layer characteristic parameters of the background noise signal are extracted and encoded. At the decoding end, the core layer codestream and enhancement layer codestream in the SID frame are extracted, the core layer characteristic parameters and enhancement layer characteristic parameters are parsed according to the core layer codestream and enhancement layer codestream, and the core layer characteristic parameters and enhancement layer characteristic parameters are decoded.

Figure 4:
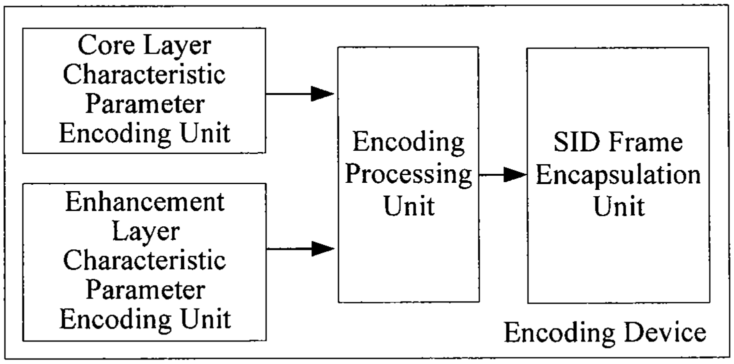
FIG. 4 is a block diagram illustrating a device for encoding the background noise signal according to an embodiment of the invention.

FIG. 4 illustrates a block diagram of a device for encoding the background noise signal according to an embodiment of the invention. As shown in FIG. 4, the device includes a core layer characteristic parameter encoding unit, an enhancement layer characteristic parameter encoding unit, an encoding unit and a SID frame encapsulation unit.

The core layer characteristic parameter encoding unit is configured to receive the background noise signal, to extract the core layer characteristic parameters of the background noise signal, and to transmit the extracted core layer characteristic parameters to the encoding unit.

The enhancement layer characteristic parameter encoding unit is configured to receive the background noise signal, to extract the enhancement layer characteristic parameters, and to transmit the enhancement layer characteristic parameters to the encoding unit.

The encoding unit is configured to encode the core layer characteristic parameters and enhancement layer characteristic parameters to obtain the core layer codestream and enhancement layer codestream and transmit the core layer codestream and enhancement layer codestream to the SID frame encapsulation unit.

The SID frame encapsulation unit is configured to encapsulate the core layer codestream and enhancement layer codestream into a SID frame.

In the embodiment, the background noise signal may be encoded using the core layer characteristic parameters and enhancement layer characteristic parameters. More characteristic parameters may be used to encode the background noise signal, which improves the encoding accuracy of the background noise signal and in turn improve the encoding quality of the background noise signal. It should be noted that the encoding device of the embodiment can extract the core layer characteristic parameters and encode the core layer characteristic parameters. Furthermore, the encoding device provided by the embodiment is compatible with the existing encoding device.

Figure 5:
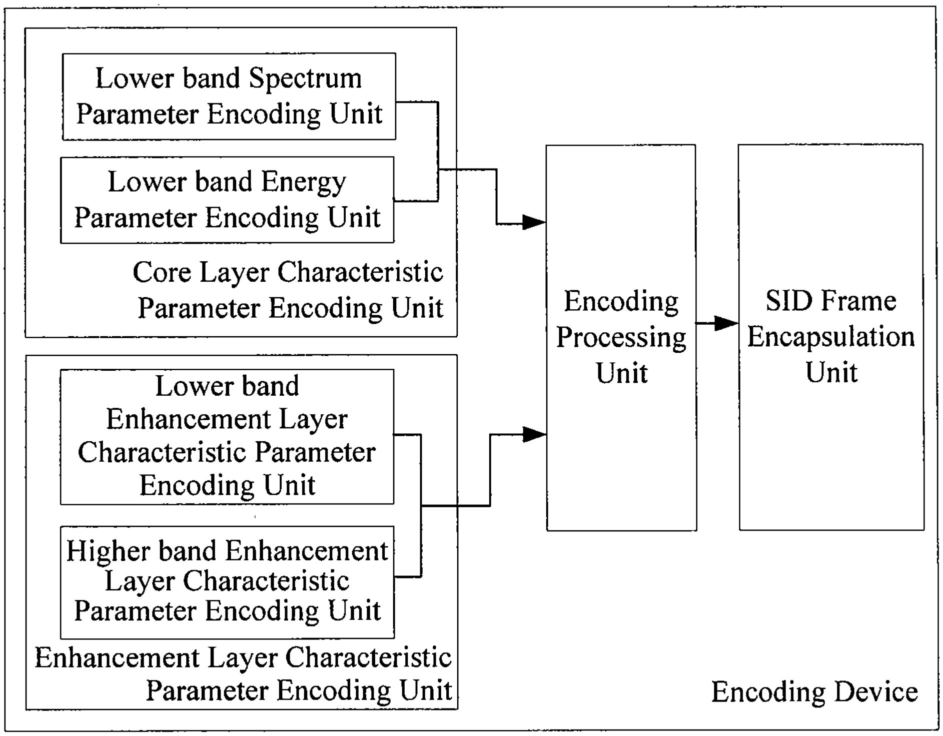
FIG. 5 is a block diagram illustrating a device for encoding the background noise signal according to another embodiment of the invention.

FIG. 5 illustrates a block diagram of a device for encoding the background noise signal according to another embodiment of the invention. As shown in FIG. 5, in the device, the core layer characteristic parameter encoding unit includes a lower band spectrum parameter encoding unit and a lower band energy parameter encoding unit. The enhancement layer characteristic parameter encoding unit includes at least one of a lower band enhancement layer characteristic parameter encoding unit and a higher band enhancement layer characteristic parameter encoding unit.

The lower band spectrum parameter encoding unit is configured to receive the background noise signal, to extract the spectrum parameter of the background noise signal and to transmit the spectrum parameter to the encoding unit.

The lower band energy encoding unit is configured to receive the background noise signal, to extract the energy parameter of the background noise signal and to transmit the energy parameter to the encoding unit.

The lower band enhancement layer characteristic parameter encoding unit is configured to receive the background noise signal, to extract the lower band enhancement layer characteristic parameter and to transmit the lower band enhancement layer characteristic parameter to the encoding unit.

The higher band enhancement layer characteristic parameter encoding unit is configured to receive the background noise signals to extract the higher band enhancement layer characteristic parameter and to transmit the higher band enhancement layer characteristic parameter to the encoding unit.

The encoding unit is configured to receive and encode the spectrum and energy parameters to obtain the core layer codestream. It is also used to receive and encode the lower band enhancement layer characteristic parameter and higher band enhancement layer characteristic parameter to obtain the enhancement layer codestream.

The SID frame encapsulation unit is configured to encapsulate the core layer codestream and enhancement layer codestream into the SID frame.

It should be noted that the enhancement layer characteristic parameter encoding unit in the embodiment includes at least one of the lower band enhancement layer characteristic parameter encoding unit and higher band enhancement layer characteristic parameter encoding unit. FIG. 5 illustrates the case that both the lower band enhancement layer characteristic parameter encoding unit and higher band enhancement layer characteristic parameter encoding unit are included. If it includes only one unit of them, e.g. the lower band enhancement layer characteristic parameter encoding unit, in FIG. 5 the higher band enhancement layer characteristic parameter encoding unit is not illustrated. Similarly, if only the higher band enhancement layer characteristic parameter encoding unit is included, in FIG. 5 the lower band enhancement layer characteristic parameter encoding unit is not illustrated.

The encoding unit may also be correspondingly adjusted according to the units included in FIG. 5 when encoding is performed. For example, if the lower band enhancement layer characteristic parameter encoding unit is not included in FIG. 5, the encoding unit is configured to receive and encode the spectrum and energy parameters to obtain the core layer codestream. It is also used to receive and encode the higher band enhancement layer characteristic parameter to obtain the enhancement layer codestream.

Corresponding to the encoding device shown in FIG. 5, the decoding device is required to decode the encoded SID frame, to obtain the reconstructed background noise signal. In the following, the device for decoding the background noise signal is described.

Figure 6:
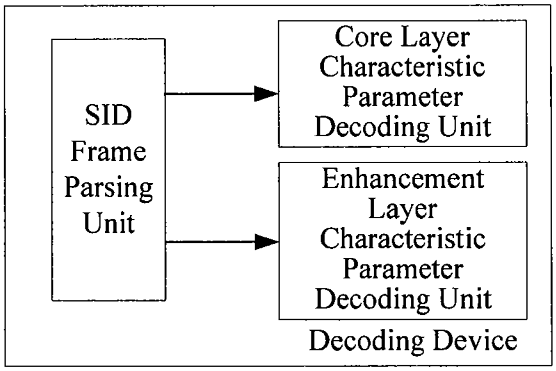
FIG. 6 is a block diagram illustrating a device for decoding the background noise signal according to another embodiment of the invention.

FIG. 6 illustrates a block diagram of a device for decoding the background noise signal according to another embodiment of the invention. As shown in FIG. 6, the decoding device includes a core layer characteristic parameter decoding unit, an enhancement layer characteristic parameter decoding unit and a SID frame parsing unit.

The SID frame parsing unit is configured to receive the SID frame of the background noise signal, to extract the core layer codestream and enhancement layer codestream, to transmit the core layer codestream to the core layer characteristic parameter decoding unit, and to transmit the enhancement layer codestream to the enhancement layer characteristic parameter decoding unit.

The core layer characteristic parameter decoding unit is configured to receive the core layer codestream, to extract the core layer characteristic parameters and synthesize the core layer characteristic parameters to obtain the reconstructed core layer background noise signal.

The enhancement layer characteristic parameter decoding unit is configured to receive the enhancement layer codestream, to extract and decode the core layer characteristic parameters to obtain the reconstructed enhancement layer background noise signal.

The decoding device of the embodiment can extract the enhancement layer codestream, and extract the enhancement layer characteristic parameters according to the enhancement layer codestream, and decode the enhancement layer characteristic parameters to obtain the reconstructed enhancement layer background noise signal. With the technical solution of the embodiment, more characteristic parameters can be used to describe the background noise signal, and the background noise signal can be decoded more accurately, thereby the quality of decoding the background noise signal can be improved.

Figure 7:
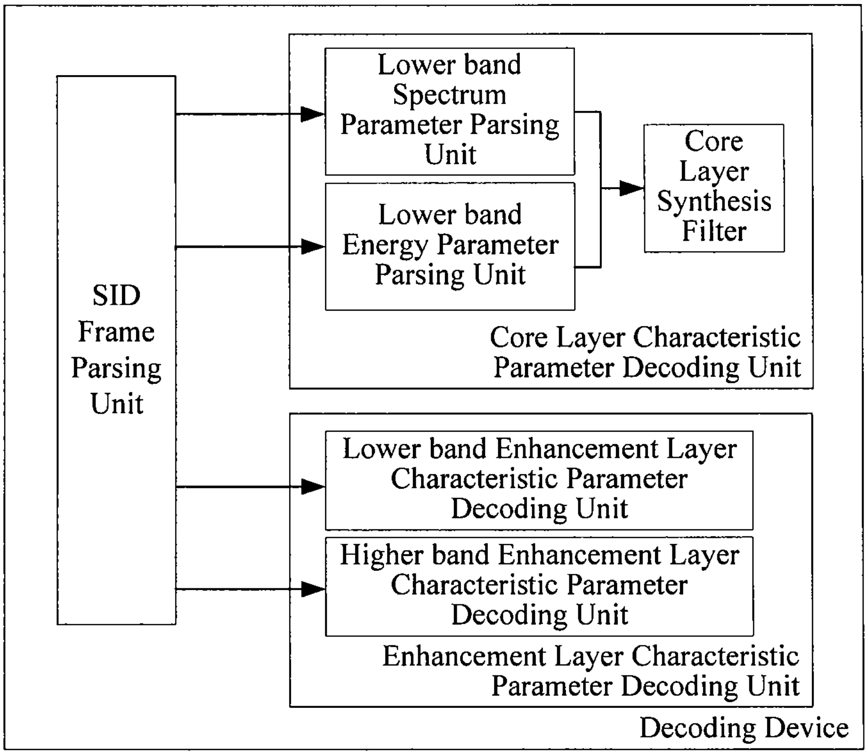
FIG. 7 is a block diagram illustrating a device for decoding the background noise signal according to another embodiment of the invention.

FIG. 7 illustrates a block diagram of a device for decoding the background noise signal according to another embodiment of the present invention. In contrast to the decoding device shown in FIG. 6, the core layer characteristic parameter decoding unit specifically includes a lower band spectrum parameter parsing unit, a lower band energy parameter parsing unit and a core layer synthesis filter; the enhancement layer characteristic parameter decoding unit specifically includes a lower band enhancement layer characteristic parameter decoding unit and a higher band enhancement layer characteristic parameter decoding unit, or one of the two decoding units.

The lower band spectrum parameter parsing unit is configured to receive the core layer codestream transmitted by the SID frame parsing unit, to extract the spectrum parameter and to transmit the spectrum parameter to the core layer synthesis filter.

The lower band energy parameter parsing unit is configured to receive the core layer codestream transmitted by the SID frame parsing unit, to extract the energy parameter and to transmit the energy parameter to the core layer synthesis filter.

The core layer synthesis filter is configured to receive and synthesize the spectrum parameter and the energy parameter to obtain the reconstructed core layer background noise signal.

The lower band enhancement layer characteristic parameter decoding unit is configured to receive the enhancement layer codestream transmitted by the SID frame parsing unit, to extract and decode the lower band enhancement layer characteristic parameters to obtain the reconstructed enhancement layer background noise signal, i.e. the reconstructed lower band enhancement layer background noise signal.

The higher band enhancement layer characteristic parameter decoding unit is configured to receive the enhancement layer codestream transmitted by the SID frame parsing unit, to extract and decode the higher band enhancement layer characteristic parameters, and to obtain the reconstructed enhancement layer background noise signal, i.e. the reconstructed higher band enhancement layer background noise signal.

The enhancement layer codestream includes the lower band enhancement layer codestream and higher band enhancement layer codestream. Both the reconstructed lower band enhancement layer background noise signal and reconstructed higher band enhancement layer background noise signal belong to a reconstructed enhancement layer background noise signal and are a part of the reconstructed background noise signal.

The lower band enhancement layer characteristic parameter decoding unit may include a lower band enhancement layer characteristic parameter parsing unit and a lower band enhancing unit. The higher band enhancement layer characteristic parameter decoding unit may include a higher band enhancement layer characteristic parameter parsing unit and a higher band enhancing unit.

The lower band enhancement layer characteristic parameter parsing unit is configured to receive the enhancement layer codestream, to extract the lower band enhancement layer characteristic parameters and to transmit the lower band enhancement layer characteristic parameters to the lower band enhancing unit.

The lower band enhancing unit is configured to receive and decode the lower band enhancement layer characteristic parameters, and to obtain the reconstructed lower band enhancement layer background noise signal.

The higher band enhancement layer characteristic parameter parsing unit is configured to receive the enhancement layer codestream, to extract the higher band enhancement layer characteristic parameters and to transmit the higher band enhancement layer characteristic parameters to the higher band enhancing unit.

The higher band enhancing unit is configured to receive and decode the higher band enhancement layer characteristic parameters, and to obtain the reconstructed higher band enhancement layer background noise signal.

It should be noted that the units included in the decoding device correspond to the units included in the encoding device shown in FIG. 5. For example, if the enhancement layer characteristic parameter encoding unit in FIG. 5 includes the lower band enhancement layer characteristic parameter encoding unit and higher band enhancement layer characteristic parameter encoding unit, the decoding device correspondingly includes the lower band enhancement layer characteristic parameter decoding unit and higher band enhancement layer characteristic parameter decoding unit. If the enhancement layer characteristic parameter encoding unit in FIG. 5 includes only the lower band enhancement layer characteristic parameter encoding unit, the decoding device includes at least the lower band enhancement layer characteristic parameter decoding unit, in addition to the core layer characteristic parameter decoding unit. If the higher band enhancement layer characteristic parameter decoding unit is not included, the unit is not shown in FIG. 7. If the device in FIG. 5 includes only the higher band enhancement layer characteristic parameter encoding unit, the decoding device includes at least the higher band enhancement layer characteristic parameter decoding unit. If the lower band enhancement layer characteristic parameter decoding unit is not included, the unit is not shown in FIG. 7.

An embodiment of the present invention also provides an encoding-decoding system, which includes an encoding device and a decoding device.

The encoding device is configured to receive the background noise signal, to extract and encode the core layer characteristic parameters and enhancement layer characteristic parameters of the background noise signal to obtain the core layer codestream and enhancement layer codestream, to encapsulate the obtained core layer codestream and enhancement layer codestream to a SID frame and to transmit the SID frame to the decoding device.

The decoding device is configured to receive the SID frame transmitted by the encoding device, to parse the core layer codestream and enhancement layer codestream; to extract the core layer characteristic parameters according to the core layer codestream; to synthesize the core layer characteristic parameters to obtain the reconstructed core layer background noise signal; to extract the enhancement layer characteristic parameters according to the enhancement layer codestream, and to decode the enhancement layer characteristic parameters to obtain the reconstructed enhancement layer background noise signal.

In the above embodiments, the detailed structures and functions of the devices for encoding and decoding the background noise signal are described. In the following, the methods for encoding and decoding the background noise signal are described.

Figure 8:
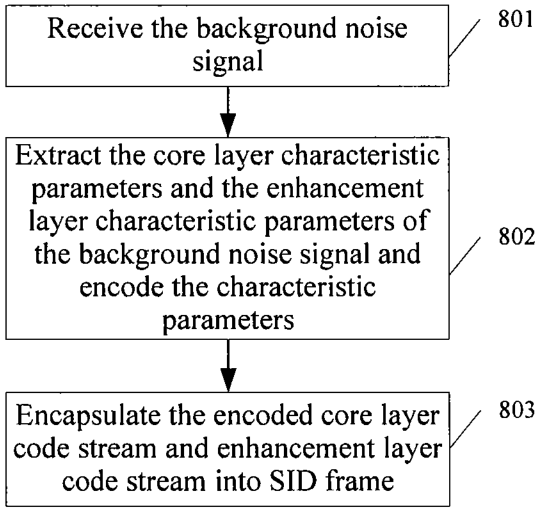
FIG. 8 is a flow chart of a method for encoding the background noise signal according to another embodiment of the invention.

FIG. 8 is a flow chart of a method for encoding the background noise signal according to another embodiment of the invention. As shown in FIG. 8, the method includes the following steps:

Step 801: The background noise signal is received.

Step 802: The core layer characteristic parameters and enhancement layer characteristic parameters of the background noise signal are extracted and the characteristic parameters are encoded to obtain the core layer codestream and enhancement layer codestream.

The core layer characteristic parameters in the embodiment also include the LSF quantization predictor index, the first stage LSF quantized vector, the second stage LSF quantized vector and the gain. The enhancement layer characteristic parameters include at least one of the lower band enhancement layer characteristic parameter and higher band enhancement layer characteristic parameter.

The values of the LSF quantization predictor index, the first stage LSF quantized vector, the second stage LSF quantized vector may be computed according to G.729, and the background noise signal may be encoded according to the computed values to obtain the core layer codestream.

The lower band enhancement layer characteristic parameter includes at least one of fixed codebook parameters and adaptive codebook parameters. The fixed codebook parameters include fixed codebook index, fixed codebook sign and fixed codebook gain. The adaptive codebook parameters include pitch delay and pitch gain.

Related standards describe methods for computing the fixed codebook index, the fixed codebook sign, the fixed codebook gain, the pitch delay and pitch gain, and methods for encoding the background noise signal according to the computation result to obtain the lower band enhancement layer codestream, which are known to those skilled in the art and are not detailed here, for the sake of simplicity.

It should be noted that the lower band enhancement layer characteristic parameters, i.e. the fixed codebook parameters and adaptive codebook parameters may be computed directly. Or, it is also possible to first compute the core layer characteristic parameters, i.e. the LSF quantization predictor index, the first stage LSF quantized vector, the second stage LSF quantized vector and the gain, and then a residual of the core layer characteristic parameters and the background noise signal is computed and is further used to compute the lower band enhancement layer characteristic parameter.

The higher band enhancement layer characteristic parameters include at least one of time-domain envelopes and frequency-domain envelopes.

In the following, the computation of the time-domain and frequency domain envelopes of the higher band enhancement layer characteristic parameters is described:

$$T_{env}(i)=\frac{1}{2}\log_2\left(\sum_{n=0}^{9}s_{HB}^2(n+i\cdot 10)\right),\quad i=0,\ldots,15$$

This equation is used to perform computation to obtain 16 time-domain envelope parameters, where $s_{HB}(n)$ is the input voice superframe signal. The G.729 specification stipulates that the length of each SID frame is 10 ms, each SID frame includes 80 sampling points. In the embodiment of the present invention, two SID frames are combined to form a 20 ms superframe, which includes 160 sampling points. The 20 ms SID frame is then divided into 16 segments each having a length of 1.25 ms. Where i designates the serial number of the divided segment; and n designates the number of samples in each segment. There are 10 sampling points in each segment.

The obtained 16 time-domain envelope parameters are averaged to obtain the time-domain envelope mean value:

$$M_T=\frac{1}{16}\sum_{i=0}^{15}T_{env}(i).$$

In the following, the computation of the time domain envelope quantized vector and frequency domain envelope quantized vector is described. First, Fast Fourier Transformation (FFT) is performed on the signal $s_{HB}(n)$. Then, the transformed signal is processed through a Hamming window $w_F(n)$ to obtain 12 frequency domain envelope parameters:

$$F_{env}(j)=\frac{1}{2}\log_2\left(\sum_{k=2j}^{2(j+1)}W_F(k-2j)\cdot\left|S_{HB}^{fft}(k)\right|^2\right),\quad j=0,\ldots,11.$$

where, $$S_{HB}^{fft}(k)=FFT_{64}(s_{HB}^{w}(n)+s_{HB}^{w}(n+64)),\quad k=0,\ldots,63,$$

$$n=-31,\ldots,32$$

$$w_F(n)=\begin{cases}\frac{1}{2}\left(1-\cos\left(\frac{2\pi n}{143}\right)\right), & n=0,\ldots,71\\ \frac{1}{2}\left(1-\cos\left(\frac{2\pi(n-16)}{111}\right)\right), & n=72,\ldots,127\end{cases}$$

Then, the differences between the 16 time domain envelope parameters and the time domain envelope mean value are computed: $T_{env}^{M}(i)=T_{env}(i)-\hat{M}_T$, i=0, . . . , 15. The 16 differences are divided into two 8 dimensional sub-vectors, that is, the time domain envelope quantized vector is obtained:

$$T_{env,1}=(T_{env}^{M}(0),T_{env}^{M}(1)_1,\ldots,T_{env}^{M}(7))\text{ and }T_{env,2}=(T_{env}^{M}(8),T_{env}^{M}(9),\ldots,T_{env}^{M}(15)).$$

The differences between the 12 frequency envelope parameters and the time envelope mean is computed, $F_{env}^{M}(j)_i=F_{env}(j)-\hat{M}_T$, j=0, . . . , 11, to obtain three 4-dimensional sub-vectors, that is, the spectrum envelope quantized vectors:

$$\begin{cases}F_{env1}=(F_{env}^{M}(0),F_{env}^{M}(1),F_{env}^{M}(2),F_{env}^{M}(3))\\ F_{env2}=(F_{env}^{M}(4),F_{env}^{M}(5),F_{env}^{M}(6),F_{env}^{M}(7))\\ F_{env3}=(F_{env}^{M}(8),F_{env}^{M}(9),F_{env}^{M}(10),F_{env}^{M}(11))\end{cases}.$$

After obtaining the time domain envelope mean value, the time domain envelope quantized vector and frequency domain envelope quantized vector, the numbers of bits are allocated for the parameters respectively, to obtain the higher band enhancement layer codestream.

Step 803: The encoded core layer codestream and enhancement layer codestream are encapsulated into SID frames.

Before the encapsulation of the core layer codestream and enhancement layer codestream into the SID frame is described, the SID frame is described. The SID frame is an embedded hierarchical SID frame. An embedded hierarchical SID frame means that the core layer codestream is placed at the start part of the SID frame to form the core layer, and the enhancement layer codestream is placed after the core layer codestream to form the enhancement layer. The enhancement layer codestream includes the lower band enhancement layer codestream and higher band enhancement layer codestream, or one of them. Here, the codestream closely following the core layer codestream may be the lower band enhancement layer codestream or the higher band enhancement layer codestream.

Figure 9:
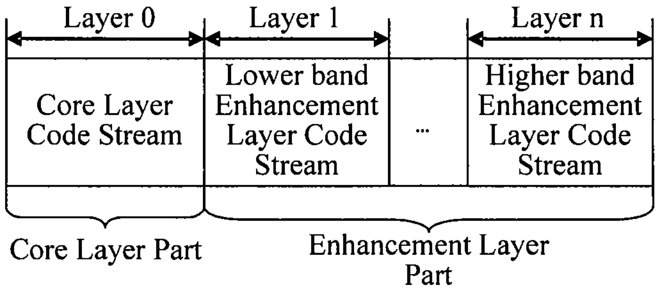
FIG. 9 is an architecture diagram of a SID frame in G.729.1 according to an embodiment of the invention.

FIG. 9 is a block diagram of the SID frame according to the embodiment of the present invention. As shown in FIG. 9, the SID frame includes a core layer part and an enhancement layer part. The enhancement layer part at least includes one of the lower band enhancement layer and the higher band enhancement layer. The higher band enhancement layer may include a plurality of layers; normally, the background noise signal in the range of 4 k~7K is encapsulated as one layer, and the background noise signal above 7K may be encoded and encapsulated as a plurality of layers, such as n layers, the value of n is determined by the frequency range of the background noise signal and the actual division of the frequency range. It should be noted that the lower band enhancement layer codestream may be located before or after the higher band enhancement layer codestream, or it may be even placed between a plurality of higher band enhancement layer codestreams. All the alternative methods are included within the protection scope of the present invention. FIG. 9 is a general graph showing a structure of the SID frame, which may be adjusted in accordance with the specific conditions. For example, if the SID frame does not include the lower band enhancement layer codestream, then in FIG. 9 there is no lower band enhancement layer.

The structure of the SID frame is shown in FIG. 9. At this step, after the background noise signal is encoded, the encoded core layer characteristic parameters and enhancement layer characteristic parameters are allocated with numbers of bits. An allocation table of the number of bits for the SID frame is shown in the following. Table 2 is an allocation table of the number of bits for the SID frame. The table includes the core layer, lower band enhancement layer and higher band enhancement layer, where the lower band enhancement layer characteristic parameter is represented with a fixed codebook parameter.

TABLE 2

| Characteristic parameters Description | Number of bits | |
|---|---|---|
| LSF quantization Predictor index | 1 | core layer |
| First stage LSF quantized vector | 5 | |
| Second stage LSF quantized vector | 4 | |
| Gain | 5 | |
| Fixed codebook index | 13 | Lower band enhancement layer |
| Fixed codebook Sign | 4 | |
| Fixed codebook gain | 3 | |
| Time domain envelope mean value | 5 | Higher band enhancement layer |
| Time domain envelope quantized vector | 14 | |
| Frequency domain envelope quantized vector | 14 | |

At this step, the process for encapsulating the core layer codestream and enhancement layer codestream into the SID frame is as follows: as shown in FIG. 2, numbers of bits are allocated for the core layer characteristic parameters, lower band enhancement layer characteristic parameters and higher band enhancement layer characteristic parameters respectively, to obtain the core layer codestream, lower band enhancement layer codestream and higher band enhancement layer codestream. The encapsulation of the SID frame is realized by inserting the obtained core layer codestream, lower band enhancement layer codestream and higher band enhancement layer codestream into the data stream according to the sequence shown in Table 2. It should be noted that, if the format shown in Table 2 is changed, e.g. if the higher band enhancement layer is placed before the lower band enhancement layer, corresponding changes is made before the SID encapsulation, that is, the core layer codestream, higher band enhancement layer codestream and lower band enhancement layer codestream are in turn inserted into the data stream. The description of the method for SID frame encapsulation does not intend to limit the scope of the present invention, and any other alternative method is also within the protection scope of the present invention. The alternative schemes of structure and encapsulation format of the SID frame are consistent with the description of the alternative schemes of structure and encapsulation format of the SID frame which are shown in FIG. 9 and Table 2.

If the enhancement layer characteristic parameters at least include the higher band enhancement layer characteristic parameter, after step 801 and before step 802, the method shown in FIG. 8 further includes: by using a quadrature mirror filter (QMF) or other filters, dividing the background noise signal into lower band background noise signal and higher band background noise signal. Specifically, the operations of step 802 to step 803 are as follows: the core layer characteristic parameters are extracted according to the lower band background noise signal, and the higher band enhancement layer characteristic parameter is extracted according to the higher band background noise signal; the core layer characteristic parameters are encoded to obtain the core layer codestream and the higher band enhancement layer characteristic parameter is encoded to generate the higher band enhancement layer codestream; and the core layer codestream and higher band enhancement layer codestream are encapsulated into the SID frame.

If the enhancement layer characteristic parameters further include the lower band enhancement layer characteristic parameter, the lower band enhancement layer characteristic parameter is also extracted according to the lower band background noise signal and encoded to generate the lower band enhancement layer codestream, which is encapsulated into the SID frame. It should be noted that both the lower band enhancement layer codestream and higher band enhancement layer codestream belong to an enhancement layer codestreams. If the enhancement layer characteristic parameters do not include the higher band enhancement layer characteristic parameters, it is not necessary to divide the background noise signal into lower band background noise signal and higher band background noise signal. Specifically, the operations of step 802 to step 803 are as follows: the core layer characteristic parameters and lower band enhancement layer characteristic parameter are extracted according to the lower band background noise signal and encoded, and the encoded core layer codestream and lower band enhancement layer codestream are encapsulated into the SID frame.

The embodiment describes the method for encoding the background noise signal. Based on the method for encoding the background noise signal, the enhancement layer characteristic parameters may be further used to more precisely encode the background noise signal, which can improve the quality for encoding the background noise signal.

Corresponding to the encoding method shown in FIG. 8, the technical solution for decoding the background noise signal is described in the following embodiment.

Figure 10:
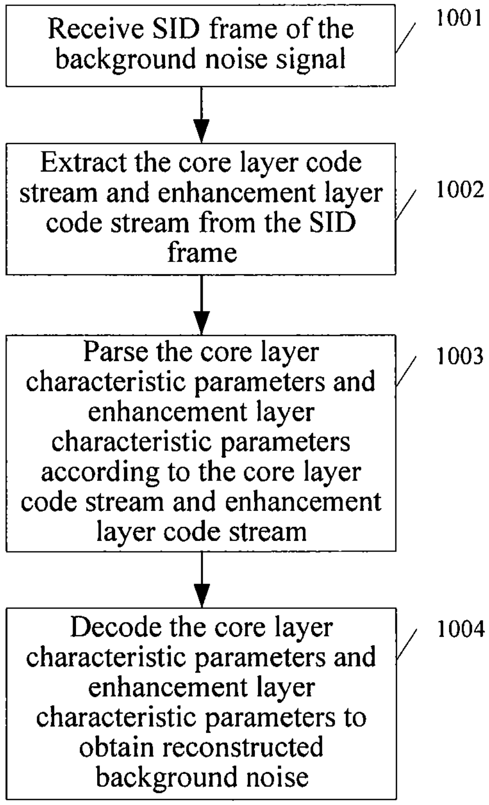
FIG. 10 is a flow chart of a method for decoding the background noise signal according to another embodiment of the invention.

FIG. 10 illustrates a flow chart of a method for decoding the background noise signal according to another embodiment of the present invention. As shown in FIG. 10, the method includes the following steps:

Step 1001: The SID frame of the background noise signal is received.

Step 1002: The core layer codestream and enhancement layer codestream is extracted from the SID frame.

At this step, the step for extracting the core layer codestream and enhancement layer codestream from the SID frame includes: intercepting the core layer codestream and enhancement layer codestream according to the SID frame encapsulated at step 803. For example, according to the format of the SID frame in Table 2, 15 bits of core layer codestream, 20 bits of lower band enhancement layer codestream and 33 bits of higher band enhancement layer codestream are in turn intercepted.

It should be noted that the enhancement layer codestream includes at least one of the lower band enhancement layer codestream and higher band enhancement layer codestream. If the lower band enhancement layer is not included in Table 2, that is, the encapsulated SID frame does not include the lower band enhancement layer codestream, the extracted enhancement layer codestream includes only the higher band enhancement layer codestream. If the encapsulation format of the SID frame shown in FIG. 2 is changed, the method for extracting the core layer codestream and enhancement layer codestream at this step is adjusted accordingly. However, it is sure that the format of the encapsulated SID frame is stipulated beforehand at the encoding and decoding ends, and the encoding and decoding operations are done according to the stipulated format to ensure the consistence between encoding and decoding.

Step 1003: The core layer characteristic parameters and enhancement layer characteristic parameters are parsed according to the core layer codestream and enhancement layer codestream.

The core layer characteristic parameters and enhancement layer characteristic parameters recited at this step are the same to that recited at step 802.

With reference to G.729, the values of the LSF quantization predictor index, first stage LSF quantized vector and second stage LSF quantized vector can be parsed.

In this embodiment, similarly, the SID frame shown in FIG. 9 is taken as an example, that is, the characteristic parameters included in the lower band enhancement layer are fixed codebook index, fixed codebook sign and fixed codebook gain. The values of the fixed codebook index, fixed codebook sign, fixed codebook gain, pitch delay and pitch gain can be computed, with reference to G.729.

At step 803, following parameters are calculated:

the time domain envelope mean value:

$$M_T = \frac{1}{16}\sum_{i=0}^{15} T_{env}(i)$$

time domain envelope quantized vector:

$T_{env,1}=(T_{env}^M(0), T_{env}^M(1)_1, \ldots, T_{env}^M(7))$ and $T_{env,2}=(T_{env}^M(8), T_{env}^M(9), \ldots, T_{env}^M(15))$ spectrum envelope quantized vector:

$$\begin{cases} F_{env,1} = (F_{env}^M(0), F_{env}^M(1)_1, F_{env}^M(2), F_{env}^M(3)) \\ F_{env,2} = (F_{env}^M(4), F_{env}^M(5)_1, F_{env}^M(6), F_{env}^M(7)) \\ F_{env,3} = (F_{env}^M(8), F_{env}^M(9)_1, F_{env}^M(10), F_{env}^M(11)) \end{cases}$$

These parameters are used to compute the time domain envelope parameters $\hat{T}_{env}(i)=\hat{T}_{env}^M(i)+\hat{M}_T$, $i=0, \ldots, 15$ and frequency domain envelope parameters $\hat{F}_{env}(j)=\hat{F}_{env}^M(j)+\hat{M}_T$, $j=0, \ldots, 11$.

Step 1004: The core layer characteristic parameters and enhancement layer characteristic parameters are parsed to obtain the reconstructed background noise signal.

At this step, the reconstructed core layer background noise signal is obtained by decoding, according to the parsed LSF quantization predictor index, first stage LSF quantized vector and second stage LSF quantized sector, with reference to G.729.

The obtained reconstructed lower band enhanced layer background noise signal is as follows:

$$\hat{s}_{enh}(n) = u_{enh}(n) - \sum_{i=1}^{10} \hat{a}_i \hat{s}_{enh}(n-i)$$

$\hat{a}_i$ is the interpolation coefficient of the linear prediction (LP) synthesis filter $\hat{A}(z)$ of the current frame; $u_{enh}(n)=u(n)+\hat{g}_{enh}\times c'(n)$ is the signal obtained by combining the lower band excitation signal u(n) and the lower band enhancement fixed-codebook excitation signal $\hat{g}_{enh}\times c'(n)$, $n=0, \ldots, 39$. The lower band enhancement fixed-codebook excitation signal $\hat{g}_{enh}\times c'(n)$ is obtained by synthesizing the fixed codebook index, fixed codebook sign and fixed codebook gain.

The method for obtaining the reconstructed higher band enhancement layer background noise signal is as follows:

In time domain, the time domain envelope parameter $\hat{T}_{env}(i)$ obtained through the decoding is used to compute the gain function $g_T(n)$, which is then multiplied with the excitation signal $s_{HB}^{exc}(n)$ to obtain $\hat{s}_{HB}^T(n)$, $\hat{s}_{HB}^T(n)=g_T(n)\cdot s_{HB}^{exc}(n)$, $n=0, \ldots, 159$.

In Frequency domain, the correction gain of two sub-frames are computed using $\hat{F}_{env}(j)=\hat{F}_{env}^M(j)+\hat{M}_T$, $j=0, \ldots, 11$: $G_{F,1}(j)=2^{\hat{F}_{env,int}(j)-\tilde{F}_{env,1}(j)}$ and $G_{F,2}(i)=2^{\hat{F}_{env}(j)-\tilde{F}_{env,2}(j)}$, $j=0, \ldots, 11$, and two linear phase finite impulse response (FIR) filters are constructed for each super-frame:

$$h_{F,l}(n) = \sum_{i=0}^{11} G_{F,l}(i)\cdot h_F^{(i)}(n) + 0.1\cdot h_{HP}(n),$$

$$n = 0, \ldots, 32 \quad l = 1, 2.$$

The two FIR correcting filters are applied to the signal $\hat{s}_{HB}^T(n)$ to generate the reconstructed higher band enhancement layer background noise signal: $\hat{s}_{HB}^F(n)$ $$\hat{s}_{HB}^F(n) = \begin{cases} \sum_{m=0}^{32} \hat{s}_{HB}^T(n-m)h_{F,1}(m), & n = 0, \ldots, 79 \\ \sum_{m=0}^{32} \hat{s}_{HB}^T(n-m)h_{F,2}(m), & n = 80, \ldots, 159 \end{cases}$$

The reconstructed core layer background noise signal, reconstructed lower band enhancement layer background noise signal and reconstructed higher band enhancement layer background noise signal obtained through decoding are synthesized, to obtain the reconstructed background noise signal, i.e. the comfortable background noise signal.

In this embodiment, the core layer characteristic parameters, one or both of the lower band enhancement layer characteristic parameter and higher band enhancement layer characteristic parameter are obtained through decoding, according to the encoded SID frame obtained by the embodiment shown in FIG. 8. The characteristic parameters are then decoded to obtain the reconstructed background noise signal. It is seen that, in addition to the core layer characteristic parameters, the lower band enhancement layer characteristic parameters and higher band enhancement layer characteristic parameters are also used to decode the background noise signal. Thus, the background noise signal can be recovered more accurately, and the quality of decoding the background noise signal can be improved.

In summary, what are described above are only exemplary embodiments of the present invention, and are not intended to limit the scope of the present invention. Any modification, equivalent substitution and improvement without departing from the scope of the present invention are intended to be included in the scope of the present invention.

What is claimed is:

1. An encoding method, comprising:

extracting core layer characteristic parameters and enhancement layer characteristic parameters of a background noise signal;

encoding the core layer characteristic parameters and enhancement layer characteristic parameters to obtain a core layer codestream and an enhancement layer codestream; and dividing the background noise signal into a lower band background noise signal and a higher band background noise signal;

wherein extracting the core layer characteristic parameters and enhancement layer characteristic parameters of the background noise signal comprises:

extracting the core layer characteristic parameters of the lower band background noise signal and extracting the higher band enhancement layer characteristic parameters of the higher band background noise signal.

2. An encoding method, comprising:

extracting core layer characteristic parameters and enhancement layer characteristic parameters of a background noise signal;

encoding the core layer characteristic parameters and enhancement layer characteristic parameters to obtain a core layer codestream and an enhancement layer codestream; and dividing the background noise signal into a lower band background noise signal and a higher band background noise signal;

wherein extracting the core layer characteristic parameters and enhancement layer characteristic parameters of the background noise signal comprises:

extracting the lower band enhancement layer characteristic parameters and core layer characteristic parameters of the lower band background noise signal; and extracting the higher band enhancement layer characteristic parameters of the higher band background noise signal.

3. A decoding method comprising:

extracting a core layer codestream and an enhancement layer codestream from a Silence Insertion Descriptor (SID) frame;

parsing core layer characteristic parameters from the core layer codestream;

parsing enhancement layer characteristic parameters from the enhancement layer codestream; and decoding the core layer characteristic parameters and enhancement layer characteristic parameters to obtain a reconstructed core layer background noise signal and a reconstructed enhancement layer background noise signal;

wherein extracting the enhancement layer codestream from the SID frame comprises extracting a lower band enhancement layer codestream from the SID frame; and parsing the enhancement layer characteristic parameters from the enhancement layer codestream comprises parsing lower band enhancement layer characteristic parameters from the enhancement layer codestream.

4. A non-transitory computer readable media comprising computer readable instructions that when combined with a processor cause the processor to function as an encoding unit configured to perform an encoding process, wherein the encoding unit comprises:

a core layer characteristic parameter encoding unit, configured to extract core layer characteristic parameters from a background noise signal received from a voice activity detector (VAD), and to transmit the core layer characteristic parameters to an encoding unit;

an enhancement layer characteristic parameter encoding unit configured to extract enhancement layer characteristic parameters from the background noise signal and to transmit the enhancement layer characteristic parameters to the encoding unit; and the encoding unit configured to encode the received core layer characteristic parameters and enhancement layer characteristic parameters to obtain a core layer codestream and an enhancement layer codestream;

wherein the enhancement layer characteristic parameter encoding unit comprises at least one of a lower band enhancement layer characteristic parameter encoding unit and a higher band enhancement layer characteristic parameter encoding unit;

wherein the lower band enhancement layer characteristic parameter encoding unit is configured to extract lower band enhancement layer characteristic parameters from the background noise signal and to transmit the lower band enhancement layer characteristic parameters to the encoding unit;

wherein the higher band enhancement layer characteristic parameter encoding unit is configured to extract higher band enhancement layer characteristic parameters from the background noise signal and to transmit the higher band enhancement layer characteristic parameters to the encoding unit; and wherein the encoding unit is configured to encode the received lower band enhancement layer characteristic parameters and higher band enhancement layer characteristic parameters to obtain the core layer codestream and enhancement layer codestream.

5. A non-transitory computer readable media comprising computer readable instructions that when combined with a processor cause the processor to function as a decoding unit configured to perform a decoding process, the decoding unit comprising:

a SID frame parsing unit, configured to receive a SID frame of a background noise signal received from a discontinuous transmission (DTX) unit to extract a core layer codestream and an enhancement layer codestream; to transmit the core layer codestream to a core layer characteristic parameter decoding unit; and to transmit the enhancement layer codestream to an enhancement layer characteristic parameter decoding unit;

the core layer characteristic parameter decoding unit, configured to extract core layer characteristic parameters from the core layer codestream and to decode the core layer characteristic parameters to obtain a reconstructed core layer background noise signal; and the enhancement layer characteristic parameter decoding unit configured to extract enhancement layer characteristic parameters from the enhancement layer codestream and to decode the enhancement layer characteristic parameters to obtain a reconstructed enhancement layer background noise signal;

wherein the enhancement layer characteristic parameter decoding unit comprises at least one of a lower band enhancement layer characteristic parameter decoding unit and a higher band enhancement layer characteristic parameter decoding unit;

wherein the lower band enhancement layer characteristic parameter decoding unit is configured to extract lower band enhancement layer characteristic parameters from the enhancement layer codestream, and to decode the lower band enhancement layer characteristic parameters to obtain the reconstructed enhancement layer background noise signal; and wherein the higher band enhancement layer characteristic parameter decoding unit is configured to extract higher band enhancement layer characteristic parameters from the enhancement layer codestream, and to decode the higher band enhancement layer characteristic parameters to obtain the reconstructed enhancement layer background noise signal.

6. The-non-transitory computer readable media of claim 5, wherein the lower band enhancement layer characteristic parameter decoding unit comprises:

a lower band enhancement layer characteristic parameter parsing unit, configured to extract the lower band enhancement layer characteristic parameters from the received enhancement layer codestream, and to transmit the lower band enhancement layer characteristic parameters to a lower band enhancing unit; and the lower band enhancing unit, configured to decode the lower band enhancement layer characteristic parameters to obtain a reconstructed enhancement layer background noise signal.

7. The non-transitory computer readable media of claim 5, wherein the higher band enhancement layer characteristic parameter decoding unit comprises:

a higher band enhancement layer characteristic parameter parsing unit, configured to extract the higher band enhancement layer characteristic parameters from the received enhancement layer codestream and to transmit the higher band enhancement layer characteristic parameters to a higher band enhancing unit; and the higher band enhancing unit, configured to decode the higher band enhancement layer characteristic parameters to obtain a reconstructed enhancement layer background noise signal.

8. An encoding method, comprising:

extracting core layer characteristic parameters and enhancement layer characteristic parameters of a background noise signal;

encoding the core layer characteristic parameters and enhancement layer characteristic parameters to obtain a core layer codestream and an enhancement layer codestream; and dividing the background noise signal into a lower band background noise signal and a higher band background noise signal;

wherein extracting the core layer characteristic parameters and enhancement layer characteristic parameters of the background noise signal comprises:

extracting the core layer characteristic parameters of the lower band background noise signal and extracting the higher band enhancement layer characteristic parameters of the higher band background noise signal; and wherein the higher band enhancement layer characteristic parameters comprise at least one of time-domain envelopes and frequency-domain envelopes.

9. The method of claim 8, wherein the time-domain envelopes comprise time-domain envelope mean values, a time domain envelope quantized vector, and frequency-domain envelopes comprises a frequency domain envelope quantized vector; wherein the time-domain envelope mean value is calculated through:

$$M_T = \frac{1}{16}\sum_{i=0}^{15} T_{env}(i),$$

where, the $M_T$ is the time-domain envelope mean value of 16 time-domain envelope parameters, the 16 time-domain envelope parameters are calculated through $$T_{env}(i) = \frac{1}{2}\log_2\left(\sum_{n=0}^{9} s_{HB}^2(n + i\cdot 10)\right),\ i = 0, \ldots, 15,$$

the $T_{env}(i)$ is i-th time-domain envelope parameter, and the $s_{HB}(n)$ is the input voice superframe signal;

the time domain envelope quantized vector is calculated through:

$T_{env,1}=(T_{env}^M(0), T_{env}^M(1)_1, \ldots, T_{env}^M(7))$ and $T_{env,2}=(T_{env}^M(8), T_{env}^M(9), \ldots, T_{env}^M(15))$;

where, the $T_{env,1}$ and $T_{env,2}$ are calculated through $T_{env}^M(i)=T_{env}(i)-\hat{M}_T$, i=0, . . . , 15, and the $\hat{M}_T$ equals to $M_T$;

the frequency domain envelope quantized vector is calculated through:

$$\begin{cases} F_{env,1} = (F_{env}^M(0), F_{env}^M(1)_1, F_{env}^M(2), F_{env}^M(3)) \\ F_{env,2} = (F_{env}^M(4), F_{env}^M(5)_1, F_{env}^M(6), F_{env}^M(7)) \\ F_{env,3} = (F_{env}^M(8), F_{env}^M(9)_1, F_{env}^M(10), F_{env}^M(11)) \end{cases}$$

where, the $F_{env,1}$, $F_{env,2}$, and $F_{env,3}$ are calculated through $F_{env}^M(j)_i=F_{env}(j)-\hat{M}_T$, j=0, . . . , 11, the $F_{env}^M(j)_i$ is the difference between the 12 frequency envelope parameters and the time envelope mean, the $F_{env}(j)$ is calculated through $$F_{env}(j) = \frac{1}{2}\log_2\left(\sum_{k=2j}^{2(j+1)} W_F(k-2j)\cdot\left|S_{HB}^{fft}(k)\right|^2\right),\ j = 0, \ldots, 11,$$

the $S_{HB}^{fft}(k)=FFT_{64}(s_{HB}^w(n)+s_{HB}^w(n+64))$, k=0, . . . , 63, n=−31, . . . , 32, and the $$w_F(n) = \begin{cases} \frac{1}{2}\left(1-\cos\left(\frac{2\pi n}{143}\right)\right), & n = 0, \ldots, 71 \\ \frac{1}{2}\left(1-\cos\left(\frac{2\pi(n-16))}{111}\right)\right), & n = 72, \ldots, 127 \end{cases}.$$

10. The method of claim 9, wherein extracting the core layer characteristic parameters and enhancement layer characteristic parameters of the background noise signal comprises:

extracting the core layer characteristic parameters and the lower band enhancement layer characteristic parameters of the background noise signal.

11. The method of claim 10, wherein extracting the lower band enhancement layer characteristic parameters comprises:

computing the lower band enhancement layer characteristic parameters according to the core layer characteristic parameter and the background noise signal.

12. The method of claim 9, further comprising:

encapsulating the obtained core layer codestream and enhancement layer codestream into a Silence Insertion Descriptor (SID) frame.

13. The method of claim 12, wherein encapsulating the core layer codestream and enhancement layer codestream into a SID frame comprises:

forming the SID frame by placing the enhancement layer codestream before or after the core layer codestream.

14. A decoding method, comprising:

extracting a core layer codestream and an enhancement layer codestream from a Silence Insertion Descriptor (SID) frame;

parsing core layer characteristic parameters from the core layer codestream;

parsing enhancement layer characteristic parameters from the enhancement layer codestream; and decoding the core layer characteristic parameters and enhancement layer characteristic parameters to obtain a reconstructed core layer background noise signal and a reconstructed enhancement layer background noise signal;

wherein the extracting the enhancement layer codestream from the SID frame comprises extracting a higher band enhancement layer codestream from the SID frame;

wherein parsing the enhancement layer characteristic parameters from the enhancement layer codestream comprises paring higher band enhancement layer characteristic parameters from the enhancement layer codestream; and wherein the higher band enhancement layer characteristic parameters comprise at least one of time-domain envelopes and frequency-domain envelopes.

15. The method of claim 14, wherein the time-domain envelopes comprise time-domain envelope mean values, a time domain envelope quantized vector, and frequency-domain envelopes comprises a frequency domain envelope quantized vector;

the time-domain envelope mean value is calculated at coding end by:

$$M_T = \frac{1}{16}\sum_{i=0}^{15} T_{env}(i),$$

where, the $M_T$ is the time-domain envelope mean value of 16 time-domain envelope parameters, the 16 time-domain envelope parameters are calculated through $$T_{env}(i) = \frac{1}{2}\log_2\left(\sum_{n=0}^{9} s_{HB}^2(n + i\cdot 10)\right), \; i = 0, \ldots , 15,$$

the $T_{env}(i)$ is i-th time-domain envelope parameter, and the $s_{HB}(n)$ is the input voice superframe signal;

the time domain envelope quantized vector is calculated at coding end by:

$$T_{env,1}=(T_{env}{}^{M}(0), T_{env}{}^{M}(1)_1, \ldots, T_{env}{}^{M}(7)) \text{ and } T_{env,2}=(T_{env}{}^{M}(8), T_{env}{}^{M}(9), \ldots, T_{env}{}^{M}(15))$$

where, the $T_{env,1}$ and $T_{env,2}$ are calculated through $T_{env}{}^{M}(i)=T_{env}(i)-\hat{M}_T$, i=0, . . . , 15, and the $\hat{M}_T$ equals to $M_T$;

the frequency domain envelope quantized vector is calculated at coding end by:

$$\begin{cases} F_{env,1} = (F_{env}^{M}(0),\, F_{env}^{M}(1)_1,\, F_{env}^{M}(2),\, F_{env}^{M}(3)) \\ F_{env,2} = (F_{env}^{M}(4),\, F_{env}^{M}(5)_1,\, F_{env}^{M}(6),\, F_{env}^{M}(7)) \\ F_{env,3} = (F_{env}^{M}(8),\, F_{env}^{M}(9)_1,\, F_{env}^{M}(10),\, F_{env}^{M}(11)) \end{cases}$$

where, the $F_{env,1}$, $F_{env,2}$, and $F_{env,3}$ are calculated through $F_{env}{}^{M}(j)_i=F_{env}(j)-M_T$, j=0, . . . , 11, the $F_{env}{}^{M}(j)_i$ is the difference between the 12 frequency envelope parameters and the time envelope mean, the $F_{env}(j)$ is calculated through $$F_{env}(j) = \frac{1}{2}\log_2\left(\sum_{k=2j}^{2(j+1)} W_F(k-2j)\cdot\left|S_{HB}^{fft}(k)\right|^2\right), \; j = 0, \ldots , 11,$$

the $S_{HB}{}^{fft}(k)=FFT_{64}(s_{HB}{}^{w}(n)+s_{HB}{}^{w}(n+64))$, k=0, . . . , 63, n=−31, . . . , 32, and the $$w_F(n) = \begin{cases} \frac{1}{2}\left(1-\cos\left(\frac{2\pi n}{143}\right)\right), & n = 0, \ldots , 71 \\ \frac{1}{2}\left(1-\cos\left(\frac{2\pi(n-16))}{111}\right)\right), & n = 72, \ldots , 127 \end{cases}.$$

16. The method of claim 15, wherein extracting the enhancement layer codestream from the SID frame comprises extracting a lower band enhancement layer codestream from the SID frame; and parsing the enhancement layer characteristic parameters from the enhancement layer codestream comprises parsing lower band enhancement layer characteristic parameters from the enhancement layer codestream.

17. The method of claim 15, wherein the reconstructed enhancement layer background noise signal comprises reconstructed lower band enhanced layer background noise signal and reconstructed higher band enhancement layer background noise signal;

wherein the reconstructed lower band enhanced layer background noise signal is obtained through:

$$\hat{s}_{enh}(n) = u_{enh}(n) - \sum_{i=1}^{10} \hat{\alpha}_i \hat{s}_{enh}(n-i)$$

where, $\hat{a}_i$ is the interpolation coefficient of the linear prediction (LP) synthesis filter $\hat{A}(z)$ of the current frame; $u_{enh}(n)=u(n)\hat{g}_{enh}\times c'(n)$ is the signal obtained by combining the lower band excitation signal u(n) and the lower band enhancement fixed-codebook excitation signal $\hat{g}_{enh}\times c'(n)$, n=0, . . . , 39, the lower band enhancement fixed-codebook excitation signal $\hat{g}_{enh}\times c'(n)$ is obtained by synthesizing fixed codebook index, fixed codebook sign and fixed codebook gain of low band enhanced layer;

wherein the reconstructed higher band enhancement layer background noise signal is obtained through:

in time domain, the time domain envelope parameter $\hat{T}_{env}(i)$ obtained through the decoding is used to compute the gain function $g_T(n)$, which is then multiplied with the excitation signal $s_{HB}{}^{exc}(n)$ to obtain $\hat{s}_{HB}{}^{T}(n)$, $\hat{s}_{HB}{}^{T}(n)=g_T(n)\cdot s_{HB}{}^{exc}(n)$, n=0, . . . , 159;

in frequency domain, the correction gain of two sub-frames are computed using $\hat{F}_{env}(j)=\hat{F}_{env}{}^{M}(j)+\hat{M}_T$, j=0, . . . , 11:$G_{F,1}(j)2^{\hat{F}_{env,int}(j)-\tilde{F}_{env,1}(j)}$ and $G_{F,2}(i)=2^{F_{env}(j)-F_{env,2}(j)}$, j=0, . . . , 11, and two linear phase finite impulse response (FIR) filters are constructed for each super-frame:

$$h_{F,l}(n) = \sum_{i=0}^{11} G_{F,l}(i)\cdot h_F^{(i)}(n) + 0.1\cdot h_{HP}(n), \; n = 0, \ldots , 32, \; l = 1, 2;$$

the two FIR correcting filters are applied to the signal $\hat{s}_{HB}{}^{T}(n)$ to generate the reconstructed higher band enhancement layer background noise signal: $\hat{s}_{HB}{}^{T}(n)$ $$\hat{s}_{HB}^{F}(n)=\begin{cases}\sum_{m=0}^{32}\hat{s}_{HB}^{T}(n-m)h_{F,1}(m),\ n=0,\ \dots\ ,79\\ \sum_{m=0}^{32}\hat{s}_{HB}^{T}(n-m)h_{F,2}(m),\ n=80,\ \dots\ ,159\end{cases}.$$

18. The method of claim 15, further comprising:

combining the reconstructed core layer background noise signal and reconstructed enhancement layer background noise signal to obtain a reconstructed background noise signal.

19. A non-transitory computer readable media comprising computer readable instructions that when combined with a processor cause the processor to function as an encoding-unit configured to perform an encoding process the encoding unit comprising:

a core layer characteristic parameter encoding unit, configured to extract core layer characteristic parameters from a background noise signal received from a voice activity detector (VAD), and to transmit the core layer characteristic parameters to an encoding unit;

an enhancement layer characteristic parameter encoding unit, configured to extract enhancement layer characteristic parameters from the background noise signal, and to transmit the enhancement layer characteristic parameters to the encoding unit; and the encoding unit, configured to encode the received core layer characteristic parameters and enhancement layer characteristic parameters to obtain a core layer codestream and an enhancement layer codestream;

wherein the enhancement layer characteristic parameter encoding unit comprises at least one of a lower band enhancement layer characteristic parameter encoding unit and a higher band enhancement layer characteristic parameter encoding unit;

wherein the lower band enhancement layer characteristic parameter encoding unit is configured to extract lower band enhancement layer characteristic parameters from the background noise signal and to transmit the lower band enhancement layer characteristic parameters to the encoding unit;

wherein the higher band enhancement layer characteristic parameter encoding unit is configured to extract higher band enhancement layer characteristic parameters from the background noise signal and to transmit the higher band enhancement layer characteristic parameters to the encoding unit, wherein the higher band enhancement layer characteristic parameters comprise at least one of time-domain envelopes and frequency-domain envelopes; and wherein the encoding unit is configured to encode the received lower band enhancement layer characteristic parameters and higher band enhancement layer characteristic parameters to obtain the core layer codestream and enhancement layer codestream.

20. The non-transitory computer readable media of claim 19, wherein, the time-domain envelope mean value is calculated by the higher band enhancement layer characteristic parameter encoding unit through:

$$M_T=\frac{1}{16}\sum_{i=0}^{15}T_{env}(i),$$

where, the $M_T$ is the time-domain envelope mean value of 16 time-domain envelope parameters, the 16 time-domain envelope parameters are calculated through $$T_{env}(i)=\frac{1}{2}\log_2\left(\sum_{n=0}^{9}s_{HB}^2(n+i\cdot 10)\right),\ i=0,\ \dots\ ,15,$$

the $T_{env}(i)$ is i-th time-domain envelope parameter, and the $s_{HB}(n)$ is the input voice superframe signal;

the time domain envelope quantized vector is calculated by the higher band enhancement layer characteristic parameter encoding unit through:

$$T_{env,1}=(T_{env}^{M}(0),T_{env}^{M}(1)_1,\ \dots\ ,T_{env}^{M}(7))\text{ and }T_{env,2}=(T_{env}^{M}(8),T_{env}^{M}(9),\ \dots\ ,T_{env}^{M}(15));$$

where, the $T_{env,1}$ and $T_{env,2}$ are calculated through $T_{env}^{M}(i)=T_{env}(i)-\hat{M}_T$, i=0, . . . , 15, and the $\hat{M}_T$ equals to $M_T$;

the frequency domain envelope quantized vector is calculated by the higher band enhancement layer characteristic parameter encoding unit through:

$$\begin{cases}F_{env,1}=(F_{env}^{M}(0),\ F_{env}^{M}(1)_1,\ F_{env}^{M}(2),\ F_{env}^{M}(3))\\ F_{env,2}=(F_{env}^{M}(4),\ F_{env}^{M}(5)_1,\ F_{env}^{M}(6),\ F_{env}^{M}(7))\\ F_{env,3}=(F_{env}^{M}(8),\ F_{env}^{M}(9)_1,\ F_{env}^{M}(10),\ F_{env}^{M}(11))\end{cases}$$

where, the $F_{env,1}$, $F_{env,2}$, and $F_{env,3}$ are calculated through $F_{env}^{M}(j)_i=F_{env}(j)-M_T$, j=0, . . . , 11, the $F_{env}^{M}(j)_i$ is the difference between the 12 frequency envelope parameters and the time envelope mean, the $F_{env}(j)$ is calculated through $$F_{env}(j)=\frac{1}{2}\log_2\left(\sum_{k=2j}^{2(j+1)}W_F(k-2j)\cdot\left|S_{HB}^{fft}(k)\right|^2\right),\ j=0,\ \dots\ ,11,$$

the $S_{HB}^{fft}(k)=FFT_{64}(s_{HB}^{w}(n)+s_{HB}^{w}(n+64))$, k=0, . . . , 63, n=−31, . . . , 32, and the $$w_F(n)=\begin{cases}\frac{1}{2}\left(1-\cos\left(\frac{2\pi n}{143}\right)\right),\ n=0,\ \dots\ ,71\\ \frac{1}{2}\left(1-\cos\left(\frac{2\pi(n-16))}{111}\right)\right),\ n=72,\ \dots\ ,127\end{cases}.$$

21. The non-transitory computer readable media of claim 20, wherein the encoding unit further comprises:

a Silence Insertion Descriptor (SID) frame encapsulation unit, configured to encapsulate the core layer codestream and enhancement layer codestream into a SID frame.

22. A non-transitory computer readable media comprising computer readable instructions that when combined with a processor cause the processor to function as a decoding unit configured to perform a decoding process the decoding unit comprising:

a SID frame parsing unit, configured to receive a SID frame of a background noise signal received from a discontinuous transmission (DTX) unit, to extract a core layer codestream and an enhancement layer codestream; to transmit the core layer codestream to a core layer characteristic parameter decoding unit; and to transmit the enhancement layer codestream to an enhancement layer characteristic parameter decoding unit;

the core layer characteristic parameter decoding unit, configured to extract core layer characteristic parameters from the core layer codestream and to decode the core layer characteristic parameters to obtain a reconstructed core layer background noise signal; and the enhancement layer characteristic parameter decoding unit, configured to extract enhancement layer characteristic parameters from the enhancement layer codestream and to decode the enhancement layer characteristic parameters to obtain a reconstructed enhancement layer background noise signal;

wherein the enhancement layer characteristic parameter decoding unit comprises at least one of a lower band enhancement layer characteristic parameter decoding unit and a higher band enhancement layer characteristic parameter decoding unit;

wherein the lower band enhancement layer characteristic parameter decoding unit is configured to extract lower band enhancement layer characteristic parameters from the enhancement layer codestream, and to decode the lower band enhancement layer characteristic parameters to obtain the reconstructed enhancement layer background noise signal;

wherein the higher band enhancement layer characteristic parameter decoding unit is configured to extract higher band enhancement layer characteristic parameters from the enhancement layer codestream, and to decode the higher band enhancement layer characteristic parameters to obtain the reconstructed enhancement layer background noise signal; and wherein the higher band enhancement layer characteristic parameters comprise at least one of time-domain envelopes and frequency-domain envelopes.

23. The non-transitory computer readable media of claim 22, wherein the time-domain envelopes comprise time-domain envelope mean values, a time domain envelope quantized vector, and frequency-domain envelopes comprises a frequency domain envelope quantized vector;

the time-domain envelope mean value is calculated at coding end by:

$$M_T = \frac{1}{16}\sum_{i=0}^{15} T_{env}(i),$$

where, the $M_T$ is the time-domain envelope mean value of 16 time-domain envelope parameters, the 16 time-domain envelope parameters are calculated through $$T_{env}(i) = \frac{1}{2}\log_2\left(\sum_{n=0}^{9} s_{HB}^2(n+i\cdot 10)\right),\ i = 0, \ldots, 15,$$

the $T_{env}(i)$ is i-th time-domain envelope parameter, and the $s_{HB}(n)$ is the input voice superframe signal;

the time domain envelope quantized vector is calculated at coding end by:

$$T_{env,1}=(T_{env}{}^{M}(0),T_{env}{}^{M}(1)_1, \ldots ,T_{env}{}^{M}(7)) \text{ and } T_{env,2}=(T_{env}{}^{M}(8),T_{env}{}^{M}(9), \ldots ,T_{env}{}^{M}(15));$$

where, the $T_{env,1}$ and $T_{env,2}$ are calculated through $T_{env}{}^{M}(i)=T_{env}(i)-\hat{M}_T$, i=0, . . . , 15, and the $\hat{M}_T$ equals to $M_T$;

the frequency domain envelope quantized vector is calculated through:

$$\begin{cases} F_{env,1} = (F_{env}^M(0),\ F_{env}^M(1)_1,\ F_{env}^M(2),\ F_{env}^M(3)) \\ F_{env,2} = (F_{env}^M(4),\ F_{env}^M(5)_1,\ F_{env}^M(6),\ F_{env}^M(7)) \\ F_{env,3} = (F_{env}^M(8),\ F_{env}^M(9)_1,\ F_{env}^M(10),\ F_{env}^M(11)) \end{cases}$$

where, the $F_{env,1}$, $F_{env,2}$, and $F_{env,3}$ are calculated through $F_{env}{}^{M}(j)_i=F_{env}(j)-M_T$, j=0, . . . , 11, the $F_{env}{}^{M}(j)_i$ is the difference between the 12 frequency envelope parameters and the time envelope mean, the $F_{env}(j)$ is calculated through $$F_{env}(j) = \frac{1}{2}\log_2\left(\sum_{k=2j}^{2(j+1)} W_F(k-2j)\cdot\left|S_{HB}^{fft}(k)\right|^2\right),\ j = 0, \ldots, 11,$$

the $S_{HB}{}^{fft}(k)=FFT_{64}(s_{HB}{}^{w}(n)+s_{HB}{}^{w}(n+64))$, k=0, . . . , 63, n=−31, . . . , 32, and the $$w_F(n) = \begin{cases} \frac{1}{2}\left(1-\cos\left(\frac{2\pi n}{143}\right)\right), & n = 0, \ldots, 71 \\ \frac{1}{2}\left(1-\cos\left(\frac{2\pi(n-16))}{111}\right)\right), & n = 72, \ldots, 127 \end{cases}.$$

24. The non-transitory computer readable media of claim 23, wherein the lower band enhancement layer characteristic parameter decoding unit comprises:

a lower band enhancement layer characteristic parameter parsing unit, configured to extract the lower band enhancement layer characteristic parameters from the received enhancement layer codestream, and to transmit the lower band enhancement layer characteristic parameters to a lower band enhancing unit; and the lower band enhancing unit, configured to decode the lower band enhancement layer characteristic parameters to obtain a reconstructed enhancement layer background noise signal.

25. The non-transitory computer readable media of claim 23, wherein the reconstructed enhancement layer background noise signal comprises reconstructed lower band enhanced layer background noise signal and reconstructed higher band enhancement layer background noise signal;

wherein the reconstructed lower band enhanced layer background noise signal is obtained through:

$$\hat{s}_{enh}(n) = u_{enh}(n) - \sum_{i=1}^{10} \hat{a}_i \hat{s}_{enh}(n-i)$$

where, $\hat{a}_i$ is the interpolation coefficient of the linear prediction (LP) synthesis filter $\hat{A}(z)$ of the current frame; $u_{enh}(n)=u(n)+\hat{g}_{enh}\times c'(n)$ is the signal obtained by combining the lower band excitation signal u(n) and the lower band enhancement fixed-codebook excitation signal $\hat{g}_{enh} \times c'(n)$, n 0, . . . , 39, the lower band enhancement fixed-codebook excitation signal $\hat{g}_{enh} \times c'(n)$ is obtained by synthesizing fixed codebook index, fixed codebook sign and fixed codebook gain of low band enhanced layer;

wherein the reconstructed higher band enhancement layer background noise signal is obtained through:

in time domain, the time domain envelope parameter $\hat{T}_{env}(i)$ obtained through the decoding is used to compute the gain function $g_T(n)$, which is then multiplied with the excitation signal $s_{HB}^{exc}(n)$ to obtain $\hat{s}_{HB}^{T}(n)$, $\hat{s}_{HB}^{T}(n)=g_T(n)\cdot s_{HB}^{exc}(n)$, n=0, . . . , 159;

in frequency domain, the correction gain of two sub-frames are computed using $\hat{F}_{env}(j)=\hat{F}_{env}^{M}(j)+\hat{M}_T$, j=0, . . . , 11: $G_{F,1}(j)=2^{\hat{F}_{env,int}(j)-\tilde{F}_{env,1}(j)}$ and $G_{F,2}(i)=2^{\hat{F}_{env}(j)-\tilde{F}_{env,2}(j)}$, j=0, . . . , 11, and two linear phase finite impulse response (FIR) filters are constructed for each super-frame:

$$h_{F,l}(n) = \sum_{i=0}^{11} G_{F,l}(i) \cdot h_F^{(i)}(n) + 0.1 \cdot h_{HP}(n),\ n = 0, \ldots, 32,\ l = 1, 2;$$

the two FIR correcting filters are applied to the signal $\hat{s}_{HB}^{T}(n)$ to generate the reconstructed higher band enhancement layer background noise signal: $\hat{s}_{HB}^{F}(n)$ $$\hat{s}_{HB}^{F}(n) = \begin{cases} \sum_{m=0}^{32} \hat{s}_{HB}^{T}(n-m)h_{F,1}(m), & n = 0, \ldots, 79 \\ \sum_{m=0}^{32} \hat{s}_{HB}^{T}(n-m)h_{F,2}(m), & n = 80, \ldots, 159 \end{cases}.$$

* * * * *